United States Patent
Santos Poli et al.

(10) Patent No.: US 12,060,770 B2
(45) Date of Patent: Aug. 13, 2024

(54) SYSTEM AND METHOD OF PRESSURE REDUCTION AND DRAINAGE OF ANNULUS OF FLEXIBLE PIPES

(71) Applicant: PETRÓLEO BRASILEIRO S.A.-PETROBRAS, Rio de Janeiro (BR)

(72) Inventors: Paulo Roberto Santos Poli, Rio de Janeiro (BR); Carlos Eduardo Maia De Souza, Rio de Janeiro (BR); George Carneiro Campello, Rio de Janeiro (BR)

(73) Assignee: PETRÓLEO BRASILEIRO S.A.—PETROBRAS, Rio de Janeiro (BR)

( * ) Notice: Subject to any disclaimer, the term of this patent is extended or adjusted under 35 U.S.C. 154(b) by 0 days.

(21) Appl. No.: 17/782,834

(22) PCT Filed: Nov. 24, 2020

(86) PCT No.: PCT/BR2020/050499
§ 371 (c)(1),
(2) Date: Jun. 6, 2022

(87) PCT Pub. No.: WO2021/108878
PCT Pub. Date: Jun. 10, 2021

(65) Prior Publication Data
US 2023/0106752 A1    Apr. 6, 2023

(30) Foreign Application Priority Data

Dec. 5, 2019    (BR) ...................... 10 2019 025812 8

(51) Int. Cl.
*E21B 34/08*    (2006.01)
(52) U.S. Cl.
CPC .................................. *E21B 34/08* (2013.01)

(58) Field of Classification Search
CPC .................................. E21B 34/08; E21B 41/04
See application file for complete search history.

(56) References Cited

U.S. PATENT DOCUMENTS 5,325,795 A * 7/1994 Nelson .................. E21B 36/008
110/236
6,634,387 B1 * 10/2003 Glejbøl .................. F16L 11/12
138/104

(Continued)

FOREIGN PATENT DOCUMENTS

BR    PI 1001933-2 A2    1/2012
WO    2014/000760 A1    1/2014

OTHER PUBLICATIONS

American Heritage Dictionary—Drive https://www.ahdictionary.com/word/search.html?q=drive (Year: 2023).*

(Continued)

*Primary Examiner* — David Carroll
(74) *Attorney, Agent, or Firm* — Sughrue Mion, PLLC

(57) ABSTRACT

The invention presents a system and method for reducing pressure and draining the annulus of submerged flexible pipes, with application in all flexible pipe structures and in any industry that uses these types of pipes. Its objectives are to eliminate condensed water and reduce the partial pressure of $CO_2$, thus restoring the integrity of the pipes. In addition, with the reduction of the pressure of the annulus gases, the operations of collection of the pipes can be carried out with greater speed, that is, in less time. The previous relief of the annulus pressure further reduces the risk of rupture of the outer cap during the operation, thus reducing the risk of exposing operators to the presence of harmful gases, when the pipe reaches the deck of the PLSV vessel.

11 Claims, 1 Drawing Sheet

(56) References Cited

U.S. PATENT DOCUMENTS

| | | | |
|---|---|---|---|
| 6,769,454 B2* | 8/2004 | Fraser | F16L 11/22 |
| | | | 138/104 |
| 8,256,469 B2 | 9/2012 | Felix-Henry | |
| 8,857,521 B2 | 10/2014 | Clements | |
| 2005/0210961 A1* | 9/2005 | De Aquino | E21B 47/007 |
| | | | 73/49.1 |
| 2008/0149209 A1* | 6/2008 | Felix-Henry | E21B 17/015 |
| | | | 137/15.04 |
| 2011/0153225 A1* | 6/2011 | Mangal | E21B 17/01 |
| | | | 702/34 |
| 2012/0085544 A1* | 4/2012 | Shilling | E21B 17/01 |
| | | | 166/345 |
| 2019/0249806 A1* | 8/2019 | Bertoni | F16L 29/007 |

OTHER PUBLICATIONS

International Search Report for PCT/BR2020/050499 dated, Jan. 16, 2021 (PCT/ISA/210).

* cited by examiner

SYSTEM AND METHOD OF PRESSURE REDUCTION AND DRAINAGE OF ANNULUS OF FLEXIBLE PIPES

CROSS REFERENCE TO RELATED APPLICATIONS

This application is a National Stage of International Application No. PCT/BR2020/050499 filed Nov. 24, 2020, claiming priority based on Brazilian Patent Application No. 10 2019 025812 8 filed Dec. 5, 2019.

FIELD OF THE INVENTION

The present invention relates to a system and method for reducing pressure and draining the annular space, in order to mitigate the occurrence of $CO_2$ stress corrosion cracking.

DESCRIPTION OF THE STATE OF THE ART

The pre-salt oil reservoirs present a high percentage of $CO_2$, which is flowed along with other gaseous components in the produced oil flow stream. The flow of most of the offshore oil production is carried out through flexible pipelines. In this type of pipe, part of the produced gases permeates through the polymeric layer of internal sealing of the flexible pipe until they reach the metallic layers (tension and pressure armors), composed of carbon steel wires, and fill the annular space of the pipe. These wires are isolated from the external environment by a polymeric outer sealing layer, known as the outer cap. The outer cap guarantees tightness to the external fluid. Thus, the rupture of this layer can cause seawater to enter the annular space. When there is contact of metallic armors with water in an annulus environment containing $CO_2$, conditions are created for the occurrence of the stress corrosion mechanism by $CO_2$, leading to the appearance of corrosion and cracking, with the possibility of rupture of metallic wires and, consequently, loss of containment of the pipes.

In addition to the rupture of the outer cap, the flooding of the annular space with seawater can occur due to a failure of the connector sealing system.

The presence of water in the annular space can also occur by the condensation of permeated water vapor. This occurs when the fluid produced contains water. The water vapor permeates through the polymeric barrier of internal sealing of the pipe (pressure barrier) and, depending on the pressure and temperature conditions, there is condensation of this vapor, building up water in the annulus.

In addition to water condensation, the pressure build-up in the annulus causes another problem when the pipe is subjected to some type of maneuver. The collection speed to be imposed by the PLSV vessel must be low due to the risk of explosion of the outer cap.

Document PI04135075B1 discloses a method of draining the gases that permeate through a flexible pipe, as well as a pipe adapted for the execution. The flexible tubular pipe comprises at least one inner pressure sheath adapted to transport hydrocarbons. The gases present in these hydrocarbons diffuse through the wall of the inner pressure sheath. The method consists of forcing the permeation gases to circulate in the annular region through the passageways towards the evacuation means.

Document WO2014108431A2 presents a system and a method of forced circulation of fluids through the annulus of a flexible tube. The flexible tube is subdivided into at least two legs, connected together by at least one pair of connectors. The procedure involves injecting circulating fluid into a first end of the annulus of the pipe and removing circulating fluid from the annulus of that same leg through at least one return tube positioned at a second end of the annulus.

The system and method described in the present invention make it possible to relieve the pressure of the gases present in the annulus, thus reducing the partial pressure of $CO_2$ and, consequently, the level of corrosivity in the annulus.

The present invention further provides for the application of vacuum in the annular space, in order to drain the water that may be present therein.

The invention can also be applied prior to the collection of flexible pipes that transport hydrocarbons, enabling the elimination of gases trapped in the annular space. In addition to reducing the time of the collection operation, the previous pressure relief in the annulus reduces the risk of rupture and consequent loss of tightness of the outer cap during the operation, mitigating the risk of exposing operators to the presence of harmful gases when the pipe arrives to the deck of the PLSV vessel.

The objective of the present invention is to reduce the factors causing corrosion by $SCC-CO_2$ (water and partial pressure of $CO_2$), contributing to the deceleration of the $SCC-CO_2$ mechanism and enabling the operational continuity of the pre-salt pipes.

This invention will also bring gains for pipes subject to failure mechanisms by $H_2S$, since such mechanisms also depend on the partial pressure of $H_2S$ built-up in the annulus.

The technology developed in the invention differs from the technologies on the market, because it allows the maintenance of low annulus pressure in any leg of flexible pipe already installed.

The present invention proposes a method with a simple device and with great flexibility of application in flexible pipes, without the need of using circulating gas, which, in this case, requires auxiliary structures and more complex equipment for use.

BRIEF DESCRIPTION OF THE INVENTION

The invention presents a system and method for reducing pressure and draining the annulus of submerged flexible pipes, with application in all flexible pipe structures and in any industry that uses these types of pipes. Its objectives are to eliminate condensed water and reduce the partial pressure of $CO_2$, thus restoring the integrity of the pipes. In addition, with the reduction of the pressure of the annulus gases, the operations of collection of the pipes can be carried out with greater speed, that is, in less time. The previous relief of the annulus pressure further reduces the risk of rupture of the outer cap during the operation, thus reducing the risk of exposing operators to the presence of harmful gases, when the pipe reaches the deck of the PLSV vessel.

BRIEF DESCRIPTION OF DRAWINGS

The present invention will be described in more detail below, with reference to the attached figures which, in a schematic form and not limiting the inventive scope, represent examples of its embodiment. In the drawings in question, there are.

DETAILED DESCRIPTION OF THE INVENTION

Figure 1:
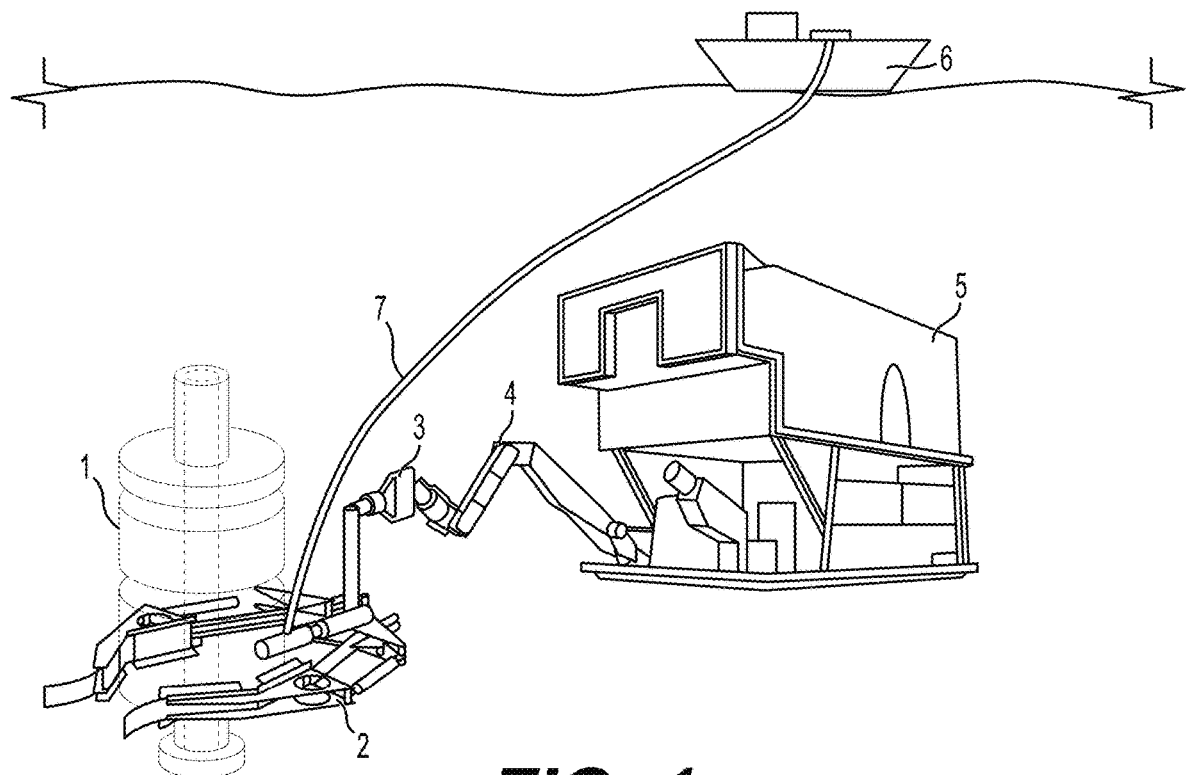
FIG. 1 illustrates the coupling of the device to the flexible pipe connector.
Figure 2:
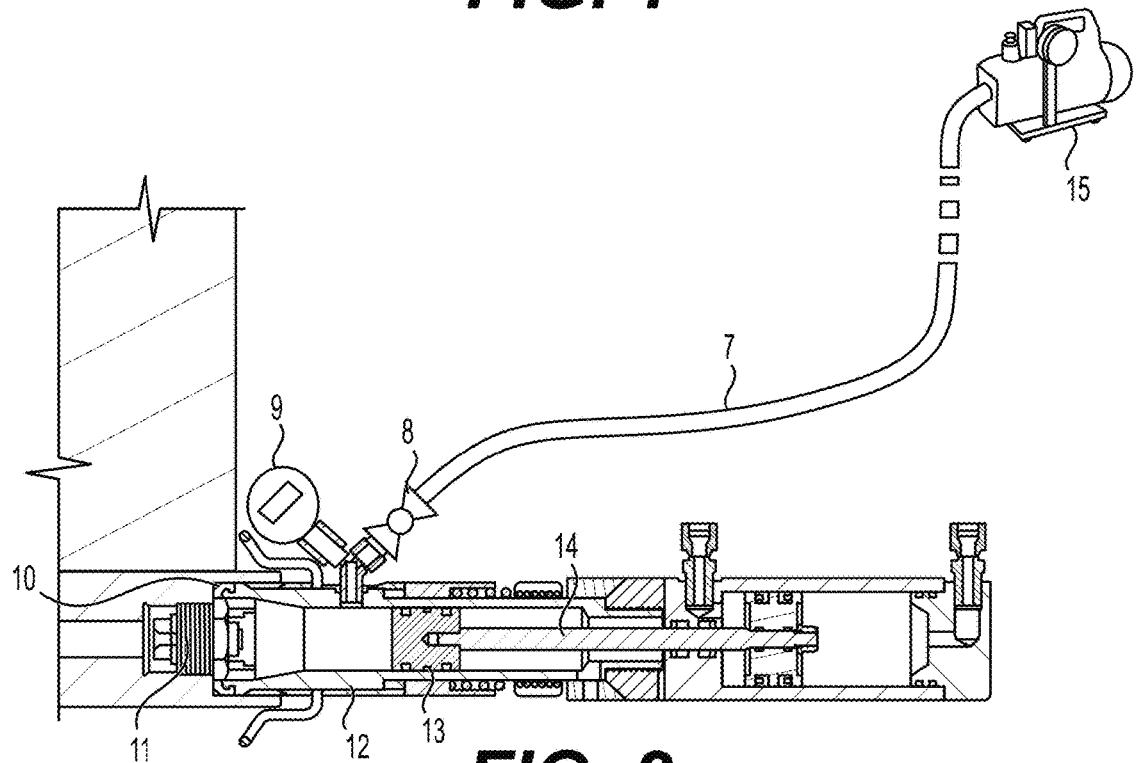
FIG. 2 illustrates the detailed system.

The invention consists of a system and method of reducing the pressure of the annulus of flexible pipes by means of a ROV (5), an anti-collapse hose (7), with the relief valve (11) present in the flexible pipe connectors (1).

The system consists of a cylinder (12) and plunger (13) assembly that is installed in the recess where the relief valve (11) of the flexible pipe connector (1) is present. The cylinder (12) has a sealing system (10) that provides tightness between the external environment and the frontal region of the cylinder plunger, where the external part of the relief valve (11) is located.

The system contains an anti-collapse hose (7), initially empty and at the atmospheric pressure, connected to an on-off valve (8), which in turn is connected to the front chamber of the cylinder (12). The anti-collapse hose (7) connects the device to a vacuum pump (15) located on a surface inspection vessel (6).

For the positioning of the cylinder (12) and plunger (13) assembly and the driving of its sealing system (10), the invention has a coupling and anchoring system (2), similar to claws, controlled by means of the hydraulic system of the ROV (5) and handled by means of the ROV manipulator (4), which holds the tool by the handle (3). This system embraces the flexible pipe connector (1) by installing the device in the relief valve recess (11) of the pipe connector (1) and providing a seal to the cylinder (12) against the valve recess wall (11). The invention should encompass any device coupling system and the driving of its sealing system.

The device sealing on the relief valve recess wall (11), providing tightness to the external environment, can be done by energizing polymeric rings or metal rings against the wall and bottom of the recess, or by opening threads in the recess wall, or other mechanism that promotes permanent attachment or not. After the driving of the sealing system (10), the plunger (13) is hydraulically driven by the ROV (5) by means of a rod (14) attached to a hydraulic piston, in order to check, through the pressure reading on the pressure gauge (9), if the device front camera is actually sealed off regarding the external environment.

Once the device is installed and sealed regarding the external environment, the pressure reduction of the annulus is done by driving the on-off valve (8) and, thus, communicating the front chamber of the device with the anti-collapse hose (7), which is at the atmospheric pressure. In this way, the pressure external to the relief valve (11) is reduced to the atmospheric pressure and this automatically drives the opening of the relief valve (11) until the annulus pressure equals atmospheric pressure. After that, the vacuum pump (15) is driven, so that the annulus pressure is reduced to the values necessary to eliminate the condensed water from the annulus of the flexible pipe.

After performing the annulus pressure reduction operation, the on-off valve (8) is closed, the sealing system (10) is de-energized and, finally, the device is removed.

The method does not necessarily require the driving of the vacuum pump because, depending on the case, the relief of the annulus to the atmospheric pressure may be sufficient to reduce the partial pressure of $CO_2$ to satisfactory levels and/or prevent the appearance of condensed water.

Additionally, the vacuum pump can be submerged and exhaust the fluid from the annulus to the sea or to a subsea tank.

As an alternative to the use of anti-collapse hoses and a vacuum pump, the system can relieve pressure from the annulus directly to a vessel initially with vacuum and coupled to the tool by means of metallic tubing.

The invention claimed is:

1. A system comprising:
   a flexible pipe connector;
   a device configured to cause pressure reduction and drainage of an annulus of at least one flexible pipe connected to the flexible pipe connector, the device comprising:
   a cylinder that is configured to connect to a relief valve of the flexible pipe connector;
   a seal that is configured to seal the cylinder to the flexible pipe connector;
   a plunger within the cylinder;
   a hydraulic actuator comprising a rod that is configured actuate the plunger;
   a valve;
   a hose;
   a vacuum pump connected to the valve via the hose; and
   a pressure gauge configured to provide a pressure reading indicating whether the cylinder is sealed to the flexible pipe connector in a state where the plunger is actuated,
   wherein the valve is configured to open such as to cause a chamber of the cylinder to be in fluid communication with the hose.

2. The system according to claim 1, further comprising a manipulator of a remotely operated vehicle (ROV), the manipulator configured to move the device to the flexible pipe connector.

3. The system according to claim 2, further comprising claws that are attached to the manipulator, the claws configured to embrace the flexible pipe connector and install the device in a recess of the relief valve of the flexible pipe connector, such that the cylinder is configured to seal against a recess wall of the relief valve.

4. The system according to claim 3, wherein the claws are configured to be hydraulically actuated based on control by the ROV.

5. The system according to claim 4, wherein the manipulator is connected to the claws via a handle, and the manipulator is configured to operate the claws via the handle.

6. A method comprising:
   sealing a cylinder of a device to a flexible pipe connector;
   actuating a plunger within the cylinder by controlling a hydraulic actuator, of the device, that includes a rod configured to actuate the plunger;
   determining that the cylinder is sealed to the flexible pipe connector based on a pressure reading, of a pressure gauge of the device, that is obtained while actuating the plunger;
   reducing pressure of an annulus of at least one flexible pipe connected to the flexible pipe connector to atmospheric pressure based on the determining, the reducing the pressure comprising opening a valve of the device, the valve connected to a hose;
   closing the valve after opening the valve;
   unsealing the cylinder from the flexible pipe connector after the reducing the pressure; and
   removing the device from the flexible pipe connector after the unsealing.

7. The method according to claim 6, wherein the valve is configured to open such as to cause a chamber of the cylinder to be in fluid communication with the hose, and the hose is at atmospheric pressure during the opening of the valve.

8. The method of claim 6, further comprising automatically closing a relief valve of the flexible pipe connector when the pressure of the annulus becomes equal to the atmospheric pressure.

9. The method of claim 8, wherein the relief valve is configured to cause the pressure of the annulus to be equal to the atmospheric pressure.

10. The method of claim 6, wherein
   the valve is connected to a vacuum pump via the hose, and
   the reducing the pressure further comprises operating the vacuum pump while the valve is opened.

11. The method of claim 10, wherein the vacuum pump, by being operated, is configured to cause the pressure in the annulus to reduce such that condensed water is removed from the annulus.

* * * * *